C. H. & T. HANSEN.
KITCHEN APPLIANCE.
APPLICATION FILED FEB. 21, 1916.
1,206,108.
Patented Nov. 28, 1916.
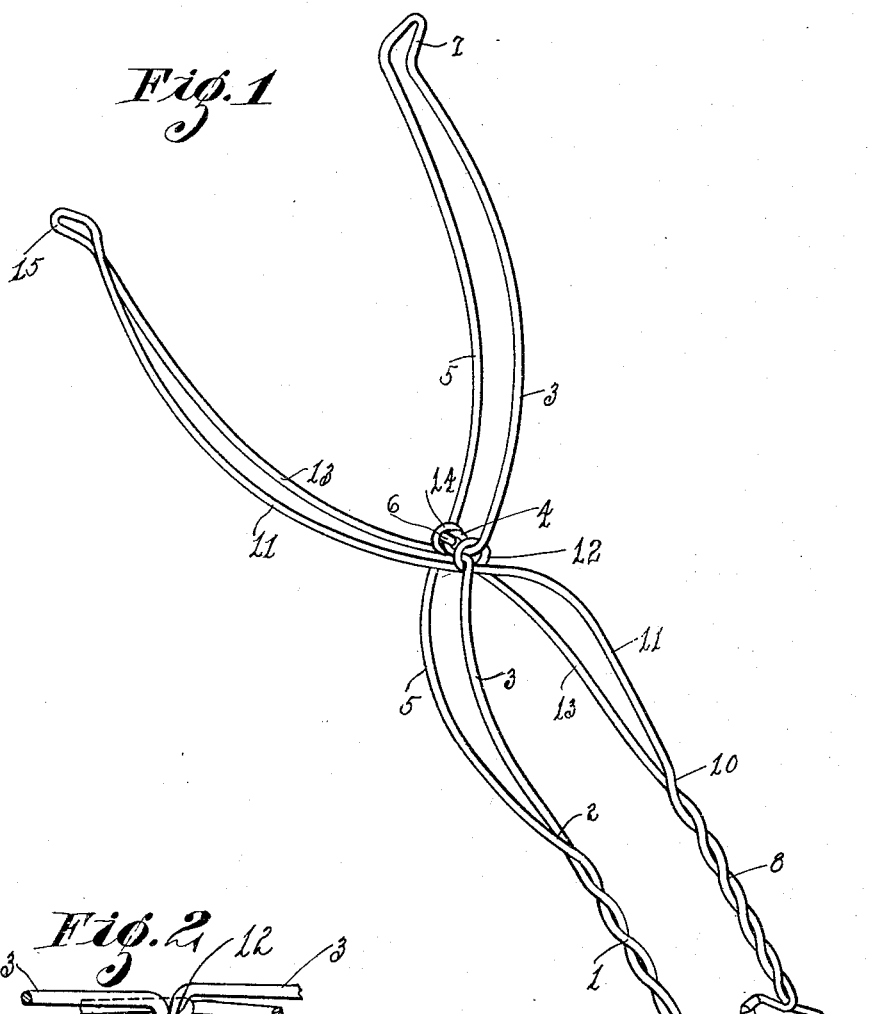
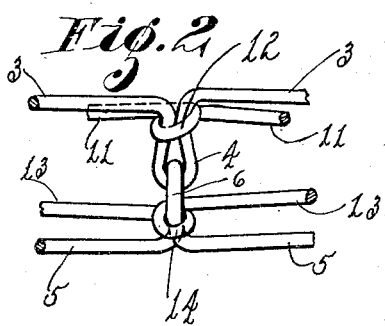
WITNESS.
Floyd M. Blanchard
INVENTORS:
Thomas Hansen
Christian H. Hansen
ATTORNEY.

UNITED STATES PATENT OFFICE.

CHRISTIAN H. HANSEN AND THOMAS HANSEN, OF BETHANY, CALIFORNIA.

KITCHEN APPLIANCE.

1,206,108.    Specification of Letters Patent.    Patented Nov. 28, 1916.

Application filed February 21, 1916. Serial No. 79,630.

*To all whom it may concern:*

Be it known that we, CHRISTIAN H. HANSEN and THOMAS HANSEN, citizens of the United States, residing at Bethany, in the county of San Joaquin, State of California, have invented certain new and useful Improvements in Kitchen Appliances; and we do declare the following to be a full, clear, and exact description of the same, reference being had to the accompanying drawings, and to the characters of reference marked thereon, which form a part of this application.

This invention relates to appliances for use in the household and particularly in and around the kitchen, the object of the invention being to produce a combination appliance capable of being used for lifting hot pans, dishes and similar articles. The appliance is also adapted for the lifting of hot lamp chimneys and articles of a like character and is in addition thereto an appliance for lifting hot stove lids. It may also be used for holding a clean cloth or rag for the purpose of wiping the inside of receptacles such as lamp chimneys and the like. In addition to all of the above mentioned functions the device can also be used as ice tongs and may likewise be used in a great many other different ways which will render it very useful in and about a household.

A further object of the invention is to produce a simple and inexpensive device and yet one which will be exceedingly effective for the purposes for which it is designed.

These objects we accomplish by means of such structure and relative arrangement of the parts as will fully appear by a perusal of the following specification and claim.

In the drawings similar characters of reference indicate corresponding parts in the several views.

Figure 1 is a perspective view of the complete appliance. Fig. 2 is a fragmentary view showing the particular form of hinge for the tongs.

Referring now more particularly to the characters of reference on the drawings the appliance is made up in the shape of pincers or tongs and comprises two distinct members having a special form of hinge particularly adapted to the appliance. One of these members comprises a handle 1 made of twisted wire and provided with a pair of projecting prongs 2ª at its end. The wires of the twisted portion 1 branch outwardly from the said handle 1, as at 2, one of the branches 3 then being bent into a loop 4. The other wire 5 is bent into a loop 6 linked into the loop 4, the said branches 3 and 5 then extending from their respective loops in spaced relation to the outer end of the appliance where they are bent into a substantially hook shaped member, as at 7. The other member has a handle 8 similar to the handle 1 provided with a pair of projecting prongs 9 adapted to coöperate with the prongs 2ª. The wires of the handle 8 branch, as at 10, one branch 11 extending to and being looped around the loop 4, as at 12, and the other branch 13 extending to and being looped around the loop 6, as at 14. The said branches 11 and 13 then extend to the outer end of the appliance where they are bent into a hook 15 similar to the hook 7.

As will be noted the branches 3 and 5, and 11 and 13, curve from the handles 8 and 1 toward the central hinge and then curve outwardly from said hinge to the hooks 7 and 15 respectively. The outer ends of the branches 5 and 13 extend slightly inside of the plane of the outer ends of the branches 3 and 11 so that when the outer ends of the appliance are engaged with a hot plate or pan the said members 5 and 13 will serve as a sort of shelf on which the plate or pan rests while the branches 3 and 11 extend out so as to engage the side of the said plate or pan in a strong frictional grip.

The outermost portion of the appliance is of a greater width than that portion between the hinge and the handles, and this is for the purpose of allowing the outer portion to be used for engaging large articles, while the inner portion between the branch and the handles is used for engaging small articles such as lamp chimneys and the like.

As can readily be seen, in order to allow of the successful operation of the appliance, it becomes necessary that the spaced wires 3 and 5 be held rigidly in their spaced relation and this is accomplished by the special form of hinge upon which we desire to lay great stress.

By referring to Fig. 2 it will be noted that the two loops 4 and 6 linked into each other, form a substantial obstacle to prevent the loops 12 and 14 coming together since the members 4 and 6 are necessarily enlarged at the points where they loop into each other. In a similar manner the loops 12 and 14 prevent the loops 4 and 6 from becoming bent or loose so that each set of loops works against the other to prevent the corresponding wires from having a tendency to pull together when the appliance is engaged in frictional grip with any article.

The hooks 7 and 15 form a means for frictionally engaging different articles and at the same time these hooks may be used for lifting stove lids. The prongs $2^a$ and 9 will allow the appliance to be used as ice tongs. Also a cleaning rag or similar object may be engaged by these prongs and used for cleaning lamp chimneys or like receptacles.

From the foregoing description it will readily be seen that our improved appliance can readily be adapted to a great many uses and while we only enumerate a few of them in this specification, still we have by no means set forth all the uses to which the appliance can be put and we therefore of course reserve the right to use the same wherever it is found adaptable. Also it will readily be seen from the foregoing description that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:

An appliance comprising two members, one member having a twisted wire handle, the wires of the handle branching beyond the handle and being formed into two loops linked together, such wires projecting beyond said loops in spaced relation, the other member having a twisted wire handle, such wires branching from the handle and being looped around the loops of the first member and curved outwardly from said loops in spaced relation, as described.

In testimony whereof we affix our signatures.

CHRISTIAN H. HANSEN.
THOMAS HANSEN.

Copies of this patent may be obtained for five cents each, by addressing the "Commissioner of Patents, Washington, D. C."